(12) United States Patent
Wu

(10) Patent No.: US 8,884,929 B2
(45) Date of Patent: Nov. 11, 2014

(54) STYLUS AUXILIARY CORE FOR REDUCING THE SCRATCHING OF PANELS

(76) Inventor: Jhuo-Nian Wu, Taichung (TW)

( * ) Notice: Subject to any disclaimer, the term of this patent is extended or adjusted under 35 U.S.C. 154(b) by 1056 days.

(21) Appl. No.: 12/795,433

(22) Filed: Jun. 7, 2010

(65) Prior Publication Data

US 2010/0307841 A1 Dec. 9, 2010

(30) Foreign Application Priority Data

Jun. 8, 2009 (TW) ................................ 98119116 A
May 20, 2010 (TW) ................................ 99116125 A

(51) Int. Cl.
*G06F 3/033* (2013.01)
*G06F 3/0354* (2013.01)
*G06F 3/039* (2013.01)

(52) U.S. Cl.
CPC ............ *G06F 3/03545* (2013.01); *G06F 3/039* (2013.01)
USPC ........................................................ 345/179

(58) Field of Classification Search
CPC ... G06F 3/03545; G06F 3/045; G06F 3/0416; G06F 3/0418; G06F 3/046; G06F 3/04883; G06F 3/0317; G06F 3/033; G06F 3/044; G06F 3/04845; G06F 3/0488; G06F 3/04886; G06F 3/0386; G06F 3/039; B43K 23/12; B43K 1/00; B43K 1/12
USPC ............................ 345/179; 178/19.01–19.07; 401/258–260
See application file for complete search history.

(56) References Cited

U.S. PATENT DOCUMENTS

| | | | | |
|---|---|---|---|---|
| 3,761,188 | A * | 9/1973 | Chin-Chih ...................... | 401/57 |
| 5,791,798 | A * | 8/1998 | Yu ..................................... | 401/57 |
| 5,850,059 | A * | 12/1998 | Yoshimura ................. | 178/19.01 |
| 5,957,601 | A * | 9/1999 | Weiss .............................. | 401/18 |
| 5,957,602 | A * | 9/1999 | Rosenthal ....................... | 401/51 |
| 6,111,565 | A * | 8/2000 | Chery et al. .................. | 345/179 |
| 6,161,976 | A * | 12/2000 | Liu .................................. | 401/57 |
| D465,806 | S * | 11/2002 | Hu .................................. | D19/36 |
| 6,664,954 | B1 * | 12/2003 | Yoshimura et al. ........... | 345/179 |
| D497,388 | S * | 10/2004 | Kit ................................. | D19/36 |
| 6,893,178 | B2 * | 5/2005 | Liu .................................. | 401/17 |
| 8,152,401 | B2 * | 4/2012 | Sokoloff ....................... | 401/198 |
| 8,502,805 | B2 * | 8/2013 | Liang ............................ | 345/179 |
| 2008/0043001 | A1 * | 2/2008 | Perkins et al. ................ | 345/179 |
| 2008/0297491 | A1 * | 12/2008 | Adkins ......................... | 345/179 |
| 2009/0208270 | A1 * | 8/2009 | Gregerson et al. ............ | 401/138 |

* cited by examiner

*Primary Examiner* — Alexander Eisen
*Assistant Examiner* — Sanjiv D Patel
(74) *Attorney, Agent, or Firm* — Egbert Law Offices, PLLC

(57) ABSTRACT

A stylus for reducing the scratching of a panel includes a stylus holder body and a stylus core. The stylus core can be removably installed into the stylus holder body, and also provided with a core head made of soft fiber used for touching the panel. The present invention allows users to replace the dirty stylus core and keep the touch panel free of dust. As the core head of the stylus core for touching the touch panel is made of soft fiber, it is possible to prevent any scratching when the core head touches or slides on the touch panel.

6 Claims, 8 Drawing Sheets

STYLUS AUXILIARY CORE FOR REDUCING THE SCRATCHING OF PANELS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a stylus, and more particularly to an innovative one which can reduce scratching of the panel.

2. Description of Related Art Including Information Disclosed Under 37 CFR 1.97 and 37 CFR 1.98.

FIG. 1 depicts a typical touch electronic device 1, which includes a smart mobile phone, PDA, Tablet PC or touch-based computer. This touch electronic device 1 is provided with a housing 101, a touch panel 102 installed into the housing 101, and a stylus 103 attached onto the housing 101.

Generally, when the stylus 103 is used for writing onto the touch panel 102, many scratches may occur on the surface of the touch panel 102, reducing the resolution of the touch panel 102.

As shown in FIG. 2, a screen shield 2 has been developed to protect the touch panel 102 against scratching by the stylus 103. Yet, the users find it difficult to attach the screen shield 2 properly onto the touch panel 102, some air bubbles may exist between the screen shield 2 and touch panel 102 due to improper adhesion, affecting not only the aesthetic effect but also the sensitivity of the touch panel 102 to the stylus 103. Besides, the resolution will also decline since the screen shield 2 may be scratched by the stylus 103 after a period of time.

BRIEF SUMMARY OF THE INVENTION

The primary objective of the present invention is to provide a stylus for reducing the scratching of the panel.

The stylus of the present invention includes a stylus holder body and a stylus core. The stylus core can be removably installed into the stylus holder body, and also provided with a core head made of soft fiber used for touching the panel.

As the core head is made of soft fiber, this can prevent any scratching when the core head touches the panel or slides on the panel.

The primary objective of the present invention is to provide an auxiliary core for reducing the scratching of the panel.

The auxiliary core of the present invention is provided with a core body, two standby cores arranged separately at both ends of the core body, and two ring slots separately between the core body and standby core. The standby core can be used as a standby stylus core when it is separated from the core body.

Alternatively, the auxiliary core of the present invention is provided with a core body, a standby core arranged at one end of the core body, and a ring slot between the core body and standby core.

When the stylus core is covered by dust, users can replace it to prevent any scratching when the core head touches the panel or slides on the panel.

DETAILED DESCRIPTION OF THE INVENTION

The features and the advantages of the present invention will be more readily understood upon a thoughtful deliberation of the following detailed description of a preferred embodiment of the present invention with reference to the accompanying drawings of two preferred embodiments.

Similar assemblies in the following descriptions are represented by serial numbers.

Figure 1:
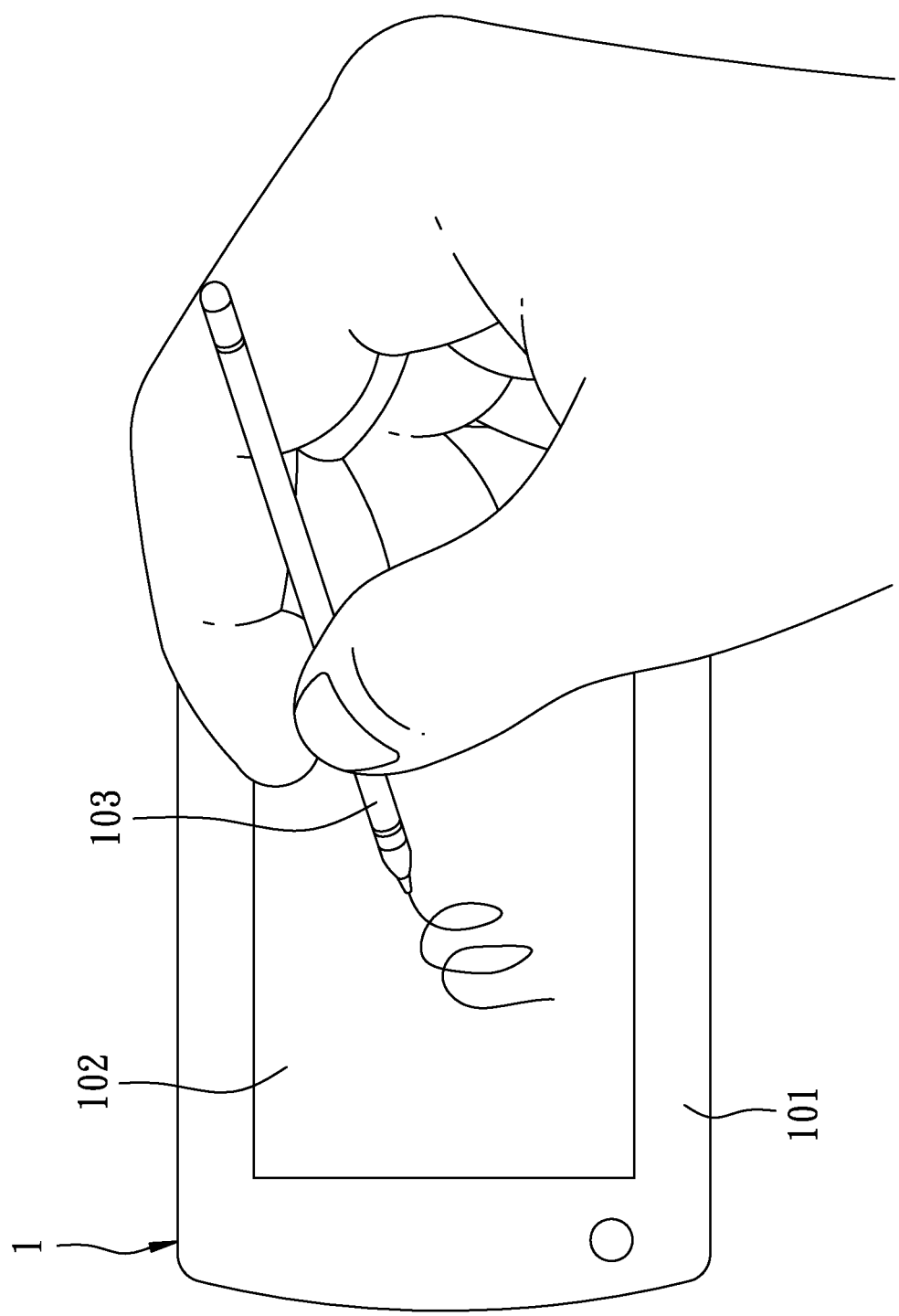
FIG. 1 shows a schematic view of typical touch electronic device that a stylus is used for writing onto a touch panel.
Figure 2:
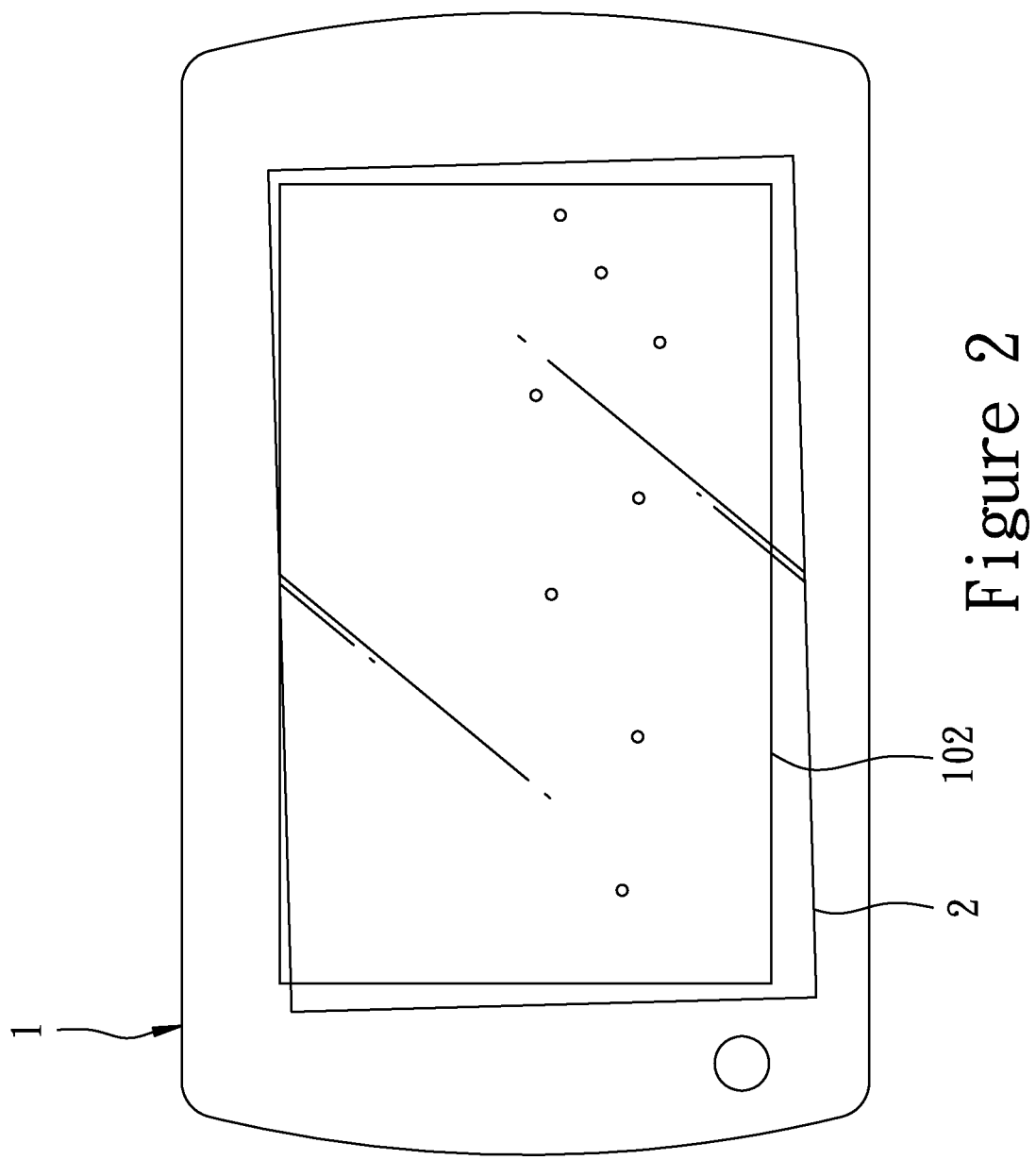
FIG. 2 shows a schematic view of a touch electronic device wherein a screen shield is attached onto the touch panel.
Figure 3:
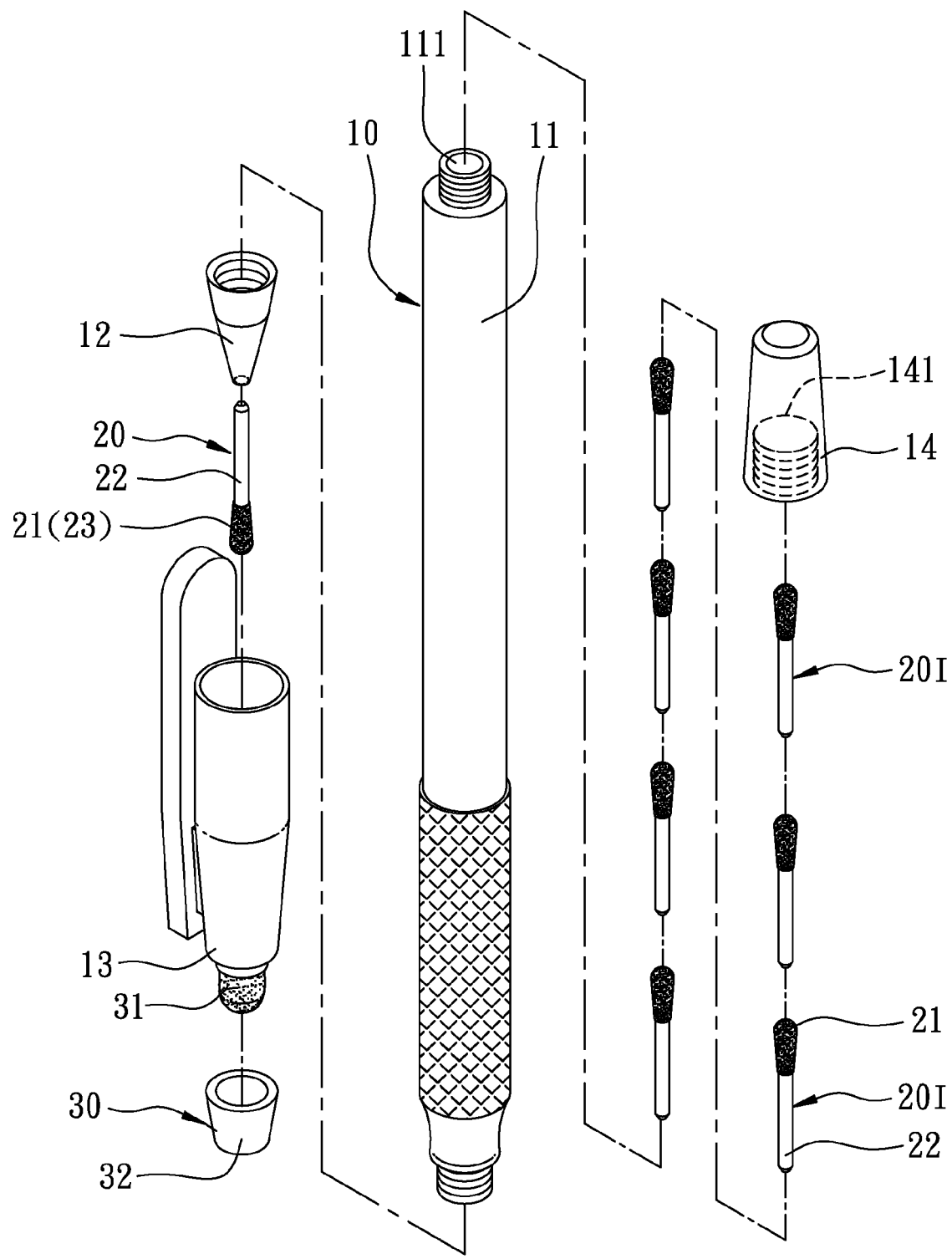
FIG. 3 shows an exploded perspective view of the first preferred embodiment of the present invention for the stylus that can reduce the scratching of the panel.
Figure 4:
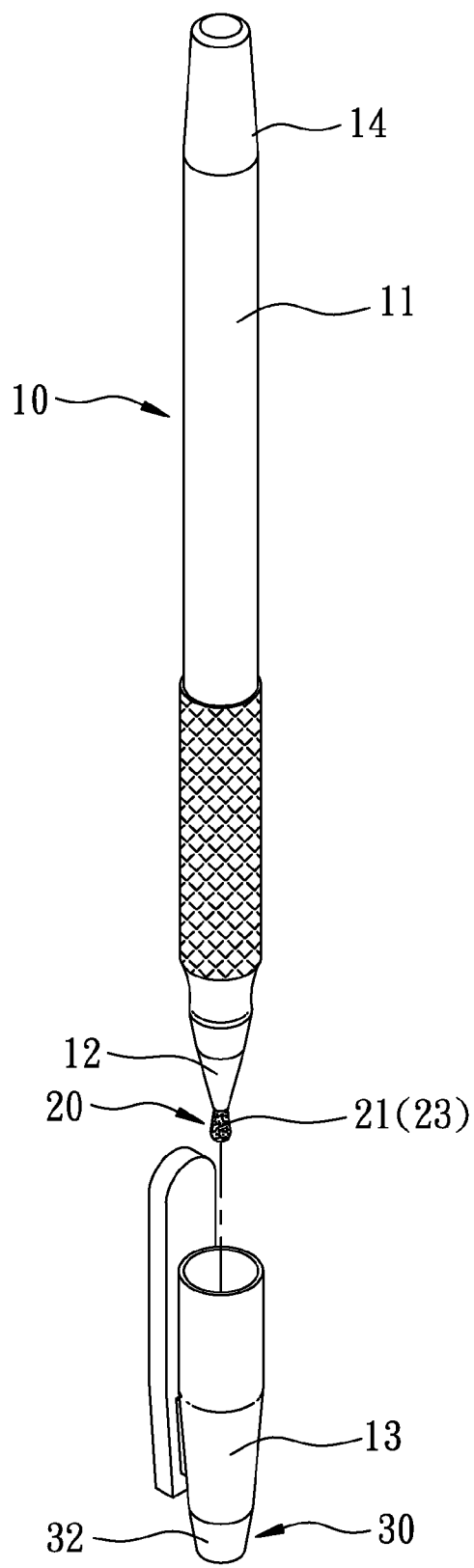
FIG. 4 shows an assembled perspective view of the first preferred embodiment of the present invention.

FIGS. 3 and 4 depict a first preferred embodiment of the stylus of the present invention for reducing the scratching of the panel, wherein the stylus comprises a stylus holder body 10, a stylus core 20, several standby stylus cores 201 and a supplement unit 30.

The stylus holder body 10 comprises a stylus holder 11, a stylus head 12 screwed at the bottom of the stylus holder 11, a stylus cover 13 sleeved onto the bottom of the stylus holder 11 to protect the stylus core 20, and a stylus cap 14 at the top of the stylus holder 11. The stylus holder 11 of hollow tubular shape is provided with a holding space 111 for storing the standby stylus cores 201. The stylus head 12 and the stylus cap 14 are used to enclose the stylus holder 11, and keep the standby stylus cores 201 into the holding space 111. The stylus cap 14 is provided with a groove 141.

The stylus core 20 can be removably installed into the stylus holder body 10. It is also provided with a core head 21 made of soft fiber used for touching the panel, a core pin 22 extended from the core head 21 and inserted removably into the stylus head 12, and grease 23 adhered onto the core head 21. The core head 21 is made of cotton, silk, nylon filament, rayon, polyester fiber, artificial silk, wool, Acrylic, Lycra and flax or their mixture. In this preferred embodiment, the core head 21 is made of cotton, while the grease 23 is a mixture containing wax and lubricant.

The grease 23 may be adhered onto the core head 21 just before the present invention is applied to the touch panel 102, or after the core head 21 is already machined. In this preferred embodiment, the grease is adhered before the present invention is applied to the touch panel 102.

The stylus cores 201 are of structure and materials equivalent to the stylus core 20, so as to replace the stylus core 20.

The supplement unit 30 includes a grease strip 31 set at the stylus cover 13 far away from one end of the stylus holder 11, and a seal cover 32 sleeved onto the stylus cover 13 for covering the grease strip 31. Of which, the grease strip 31 contains the mixture of wax and lubricant.

Figure 5:
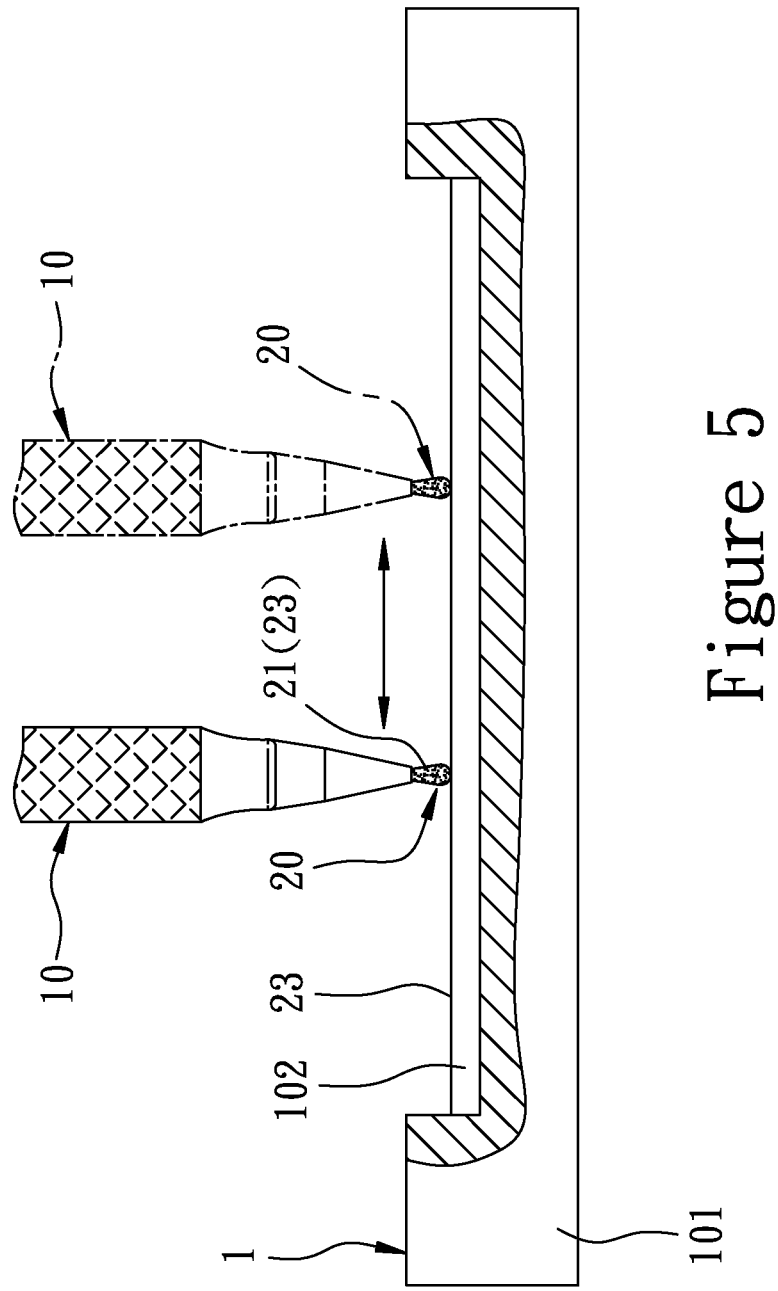
FIG. 5 shows a schematic view of the first preferred embodiment of the present invention in use.

Referring to FIG. 5, the users may adhere the grease 23 onto the core head 21 of the stylus core 20 before writing onto the touch panel 102 of the touch electronic device 1.

When the core head 21 adhered with grease 23 slides on the touch panel 102, a lubricating layer will be formed on the surface of the touch panel 102, so that the core head 21 can slide more smoothly. Moreover, as the core head 21 is made of cotton, the stylus of the present invention can reduce the possible scratching of the touch panel 102, thus maintaining the resolution of the touch panel 102.

In addition, fine dust in the air may be accumulated gradually on the touch panel 102. If the present invention is used, the dust may be transferred by the core head 21 from the touch panel 102, leading to scratching on the touch panel 102 due to friction between the dust and the touch panel 102. In such a case, it is required to duly remove the dust on the touch panel 102, and the user can adhere the grease of the grease strip 31 (FIG. 3) onto the stylus core 20, so that the adhering capability of core head 21 can be improved, helping to remove the dust on the touch panel 102.

Referring to FIGS. 3 and 4, when the core head 21 of the stylus core 20 has to be replaced due to dust adhesion, a single standby stylus core 201 is taken out to replace the stylus core 20. Namely, this involves disassembling the used stylus core 20, unscrewing the stylus cap 14 and pouring out a standby stylus core 201 from the stylus holder 11 into the groove 141 of the stylus cap 14. Next, the user makes the stylus cap 14 abut on the stylus head 12, such that the core pin 22 of the standby stylus core 201 can be successfully inserted into the stylus head 12, and the stylus cap 14 is reset.

When the grease 23 is used to adhere and remove most of dust on the touch panel 102, a minor amount of grease may be left on the touch panel 102, then a liquid lubricating layer is formed on the touch panel 102 to reduce the frictional resistance between the touch panel 102 and the core head 21, so users can apply a new stylus core 20 to write smoothly on the touch panel 102. If the frictional resistance is greater, the grease may be adhered properly to reduce greatly the frictional resistance between the touch panel 102 and the core head 21.

Referring to FIGS. 3, 4 and 5, the present invention allows users to replace the dirty stylus core 20 and keep the touch panel 102 free of dust. As the core head 21 of the stylus core 20 for touching the touch panel 102 is made of soft fiber, it is possible to prevent any scratching when the core head 21 touches or slides on the touch panel 102.

As the core head 21 of the stylus core 20 has to be replaced due to dust adhesion, standby stylus cores 201 shall be supplemented once several stylus cores 201 in the holding space 111 are used up.

Figure 6:
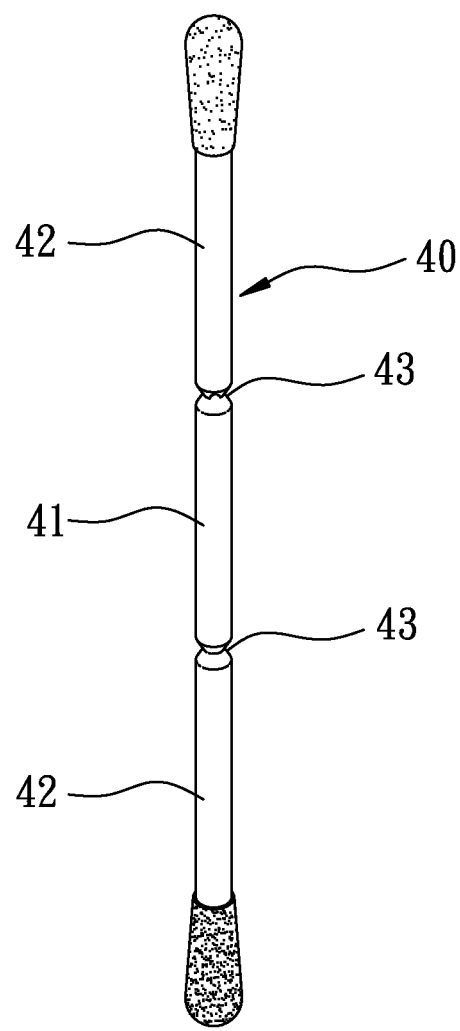
FIG. 6 shows a schematic view of the first preferred embodiment of the present invention for the auxiliary core.
Figure 7:
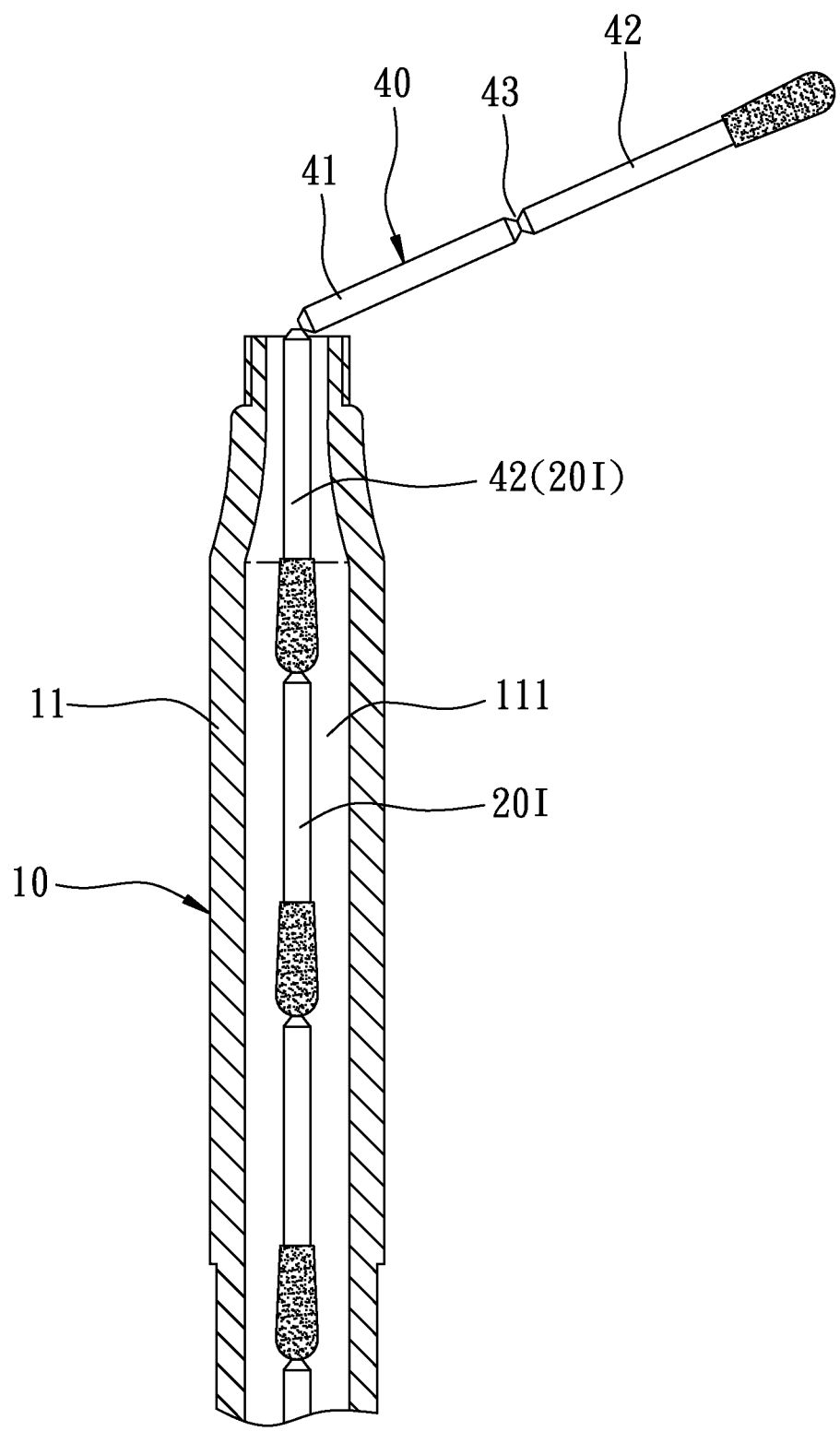
FIG. 7 shows a partial sectional view showing that a standby core of the auxiliary core is broken and supplemented into a stylus holder.

Referring to FIGS. 3, 6 and 7, the first preferred embodiment of the auxiliary core 40 is provided with the a core body 41, two standby cores 42 arranged separately at both ends of the core body 41, and two ring slots 43 separately between the core body 41 and standby core 42.

When the standby stylus cores 201 have to be supplemented, the user is only required to unscrew the stylus head 12 to generate a gap on the enclosed holding space 111 of the stylus holder 11, then hold the core body 41 at middle of the auxiliary core 40, and insert a standby core 42 into the proper depth of the holding space 111. Next, the user breaks off the auxiliary core 40 at the ring slot 43 to make the standby core 42 separate from the core body 41, so the standby core 42 can be used as a standby stylus core 201.

Referring to FIG. 5, as the core head 21 is made of soft fiber, this can prevent any scratching when the core head 21 touches or slides on the touch panel 102. Moreover, the grease 23 adhered onto the core head 21 can reduce the sliding resistance of the core head 21 on the touch panel 102, and remove duly the dust adhered on the touch panel 102, thus reducing efficiently the possible scratching of the touch panel.

Figure 8:
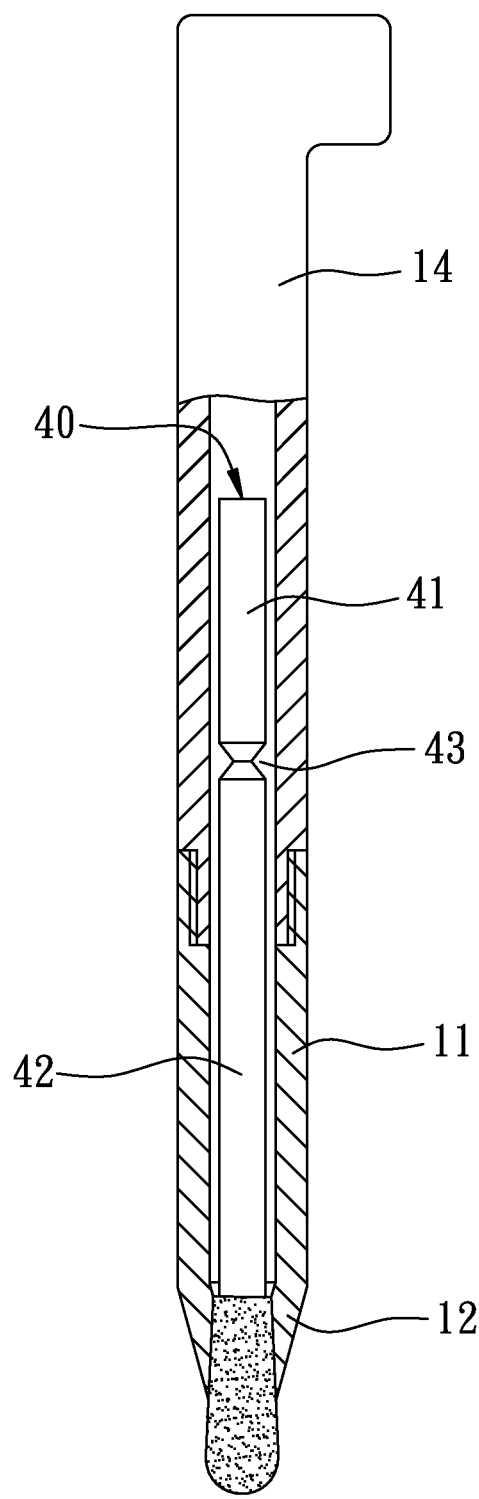
FIG. 8 shows a partial sectional view of the second preferred embodiment showing the stylus and auxiliary core for reducing the scratching of the panel.

FIG. 8 depicts the second preferred embodiment of the stylus and auxiliary core of the present invention, wherein a small stylus is configured to be embedded into the small-sized touch electronic device. In this preferred embodiment, the stylus holder 11 and the stylus head 12 are prefabricated, while the stylus cap 14 and the stylus holder 11 are screwed together. The auxiliary core 40 is provided with a core body 41, a standby core 42 arranged at one end of the core body 41, and a ring slot between the core body 41 and a standby core 42. When the standby core 42 has to be replaced due to dust adhesion, the user is only required to replace it with a new auxiliary core 40, namely, unscrew the stylus cap 14 and take out a standby core 42 adhered with dust, then insert a new auxiliary core 40 into the stylus head 12, and take up it backwards by snapping the ring slot 43 by two finger nails.

Although the invention has been explained in relation to its preferred embodiment, it is to be understood that many other possible modifications and variations can be made without departing from the spirit and scope of the invention as hereinafter claimed.

I claim:

1. A stylus for reducing a scratching of a panel, the stylus comprising:

a stylus holder body having a stylus holder, a stylus head, and a stylus cap, wherein said stylus head screwed onto an end of said stylus holder, said stylus cap having a groove and being affixed to an opposite end of said stylus holder, said stylus holder being of a hollow tubular shape having a holding space, said stylus cap and said stylus head enclosing said holding space of said stylus holder;

a stylus core removably installed into said stylus holder body, said stylus core having a core head and a core pin, wherein said core head is formed of soft fiber, and is suitable for touching the panel, said core head extending outwardly of said stylus holder body such that a diameter of said core head increases in a direction away from said stylus holder body, said core pin extending from said core head and removably inserted into said stylus head;

a plurality of standby stylus cores removably received in said holding space, said plurality of standby stylus cores being stored in said holding space such that said core head is positioned opposite the panel, said groove of said stylus cap receiving one of said plurality of standby stylus cores; and an auxiliary core having a core body with a pair of standby cores arranged separately at opposite ends of said core body, said auxiliary core having a pair of ring slots positioned separately between said core body and the standby core, the standby core suitable for use as a standby stylus core when the standby core is separated from said core body, the user breaks off the auxiliary core at the ring slot to make the standby core separate from the core body so that the standby core can be used as a standby stylus core.

2. The stylus of claim 1, said stylus core having a grease adhered thereto, said grease containing wax.

3. The stylus of claim 1, said stylus core having a grease adhered thereto, said grease containing a lubricant.

4. The stylus of claim 1, said twined soft fiber selected from the group consisting of cotton, silk, nylon, rayon, polyester, artificial silk, wool, acrylic, 13/era and mixtures thereof.

5. The stylus of claim 1, said stylus holder body having a stylus cover sleeved onto said end of said stylus holder.

6. The stylus of claim 5, further comprising:
a grease strip positioned on said stylus cover away from said end of said stylus holder; and
a seal cover sleeved onto said stylus cover so as to cover said grease strip.

* * * * *